(12) United States Patent
Schrader et al.

(10) Patent No.: US 11,506,228 B2
(45) Date of Patent: Nov. 22, 2022

(54) SYSTEM AND METHOD FOR ENERGIZING A SOLENOID COIL FOR FAST SOLENOID ACTUATION

(71) Applicant: Capstan Ag Systems, Inc., Topeka, KS (US)

(72) Inventors: Kale Schrader, Hiawatha, KS (US); Duane Needham, Berkeley, CA (US)

(73) Assignee: Capstan Ag Systems, Inc., Topeka, KS (US)

( * ) Notice: Subject to any disclaimer, the term of this patent is extended or adjusted under 35 U.S.C. 154(b) by 402 days.

(21) Appl. No.: 16/580,674

(22) Filed: Sep. 24, 2019

(65) Prior Publication Data
US 2020/0096019 A1  Mar. 26, 2020

Related U.S. Application Data

(60) Provisional application No. 62/736,272, filed on Sep. 25, 2018.

(51) Int. Cl.
*F15B 13/044* (2006.01)
*F16K 31/06* (2006.01)
(Continued)

(52) U.S. Cl.
CPC .......... *F15B 13/0442* (2013.01); *F15B 1/033* (2013.01); *F15B 15/18* (2013.01);
(Continued)

(58) Field of Classification Search
CPC ...... F15B 13/0442; F15B 1/033; F15B 15/18; F15B 2201/40; F15B 2201/51;
(Continued)

(56) References Cited

U.S. PATENT DOCUMENTS

| 4,227,231 A | 10/1980 | Hansen et al. |
| 4,661,766 A | 4/1987 | Hoffman et al. |

(Continued)

FOREIGN PATENT DOCUMENTS

| CN | 105569859 A | 5/2016 |
| EP | 1346637 A1 | 9/2003 |
| EP | 2165770 A1 | 3/2010 |

OTHER PUBLICATIONS

Written Opinion of the International Preliminary Examining Authority issued in connection with International Application No. PCT/US2018/045160, dated Jun. 28, 2019, 5 pages.
(Continued)

*Primary Examiner* — Patrick C Williams
(74) *Attorney, Agent, or Firm* — Armstrong Teasdale LLP

(57) ABSTRACT

A drive circuit for operating a solenoid includes a main switch and a charge pump circuit. The main switch is coupled in series with a coil of the solenoid. The main switch is configured to selectively enable current flow from a voltage source according to a main switching signal to translate a poppet of the solenoid between an opened position and a closed position. The charge pump circuit is coupled to the voltage source. The charge pump circuit is configured to discharge through the coil to translate the poppet from the closed position to the opened position, and to charge when the poppet is held in the opened position.

27 Claims, 9 Drawing Sheets

(51) Int. Cl.
*F15B 1/033* (2006.01)
*F15B 15/18* (2006.01)
*H01F 7/18* (2006.01)
*A01C 7/06* (2006.01)

(52) U.S. Cl.
CPC ........ F16K 31/0606 (2013.01); H01F 7/1811 (2013.01); *A01C 7/06* (2013.01); *F15B 2201/40* (2013.01); *F15B 2201/51* (2013.01); *H01F 7/1816* (2013.01); *H01F 2007/1822* (2013.01); *H01F 2007/1888* (2013.01)

(58) Field of Classification Search
CPC .. F16K 31/0606; H01F 7/1811; H01F 7/1816; H01F 2007/1822; H01F 2007/1888; A01C 7/06
See application file for complete search history.

(56) References Cited

U.S. PATENT DOCUMENTS

| | | | |
|---|---|---|---|
| 4,729,056 A | 3/1988 | Edwards et al. | |
| 4,967,309 A | 10/1990 | Hoffman | |
| 5,052,174 A | 10/1991 | Bak | |
| 5,134,961 A | 8/1992 | Giles et al. | |
| 5,324,359 A | 6/1994 | Cleveland et al. | |
| 5,499,157 A | 3/1996 | Younessi et al. | |
| 5,653,389 A | 8/1997 | Henderson et al. | |
| 5,704,546 A | 1/1998 | Henderson et al. | |
| 5,881,919 A | 3/1999 | Womac et al. | |
| 5,908,161 A | 6/1999 | Womac et al. | |
| 5,967,066 A | 10/1999 | Giles et al. | |
| 6,019,347 A | 2/2000 | Adams et al. | |
| 6,302,080 B1 | 10/2001 | Kato et al. | |
| 6,324,046 B1 | 11/2001 | Kadah | |
| 6,374,624 B1 | 4/2002 | Cholkeri et al. | |
| 6,493,204 B1 | 12/2002 | Glidden et al. | |
| 7,311,004 B2 | 12/2007 | Giles | |
| 7,502,665 B2 | 3/2009 | Giles et al. | |
| 7,742,842 B2 | 6/2010 | Giles et al. | |
| 7,826,930 B2 | 11/2010 | Giles et al. | |
| 8,191,795 B2 | 6/2012 | Grimm et al. | |
| 9,435,458 B2 | 9/2016 | Needham et al. | |
| 9,635,848 B2 | 5/2017 | Needham et al. | |
| 10,441,965 B2 | 10/2019 | Feldhaus et al. | |
| 2005/0279299 A1* | 12/2005 | Degner .................. | F01L 9/20 123/90.11 |
| 2005/0279780 A1 | 12/2005 | Evans et al. | |
| 2006/0102234 A1 | 5/2006 | Meisel | |
| 2006/0151544 A1 | 7/2006 | Greenwald et al. | |
| 2006/0225489 A1 | 10/2006 | Giles et al. | |
| 2006/0265106 A1 | 11/2006 | Giles et al. | |
| 2006/0273189 A1 | 12/2006 | Grimm et al. | |
| 2007/0188967 A1 | 8/2007 | Smith et al. | |
| 2008/0230624 A1 | 9/2008 | Giles et al. | |
| 2009/0213519 A1 | 8/2009 | Bedingfield | |
| 2009/0309054 A1 | 12/2009 | Haller et al. | |
| 2009/0323246 A1* | 12/2009 | Brenner .................. | F02D 41/20 361/154 |
| 2010/0032492 A1 | 2/2010 | Grimm et al. | |
| 2010/0259861 A1 | 10/2010 | Wendt | |
| 2012/0228395 A1 | 9/2012 | Needham et al. | |
| 2013/0027833 A1 | 1/2013 | Rabe et al. | |
| 2014/0299673 A1 | 10/2014 | Grimm et al. | |
| 2015/0300522 A1 | 10/2015 | Ito et al. | |
| 2015/0367357 A1 | 12/2015 | Humpal et al. | |
| 2015/0367358 A1 | 12/2015 | Funseth et al. | |
| 2016/0203931 A1 | 7/2016 | Ramsey et al. | |
| 2016/0265811 A1 | 9/2016 | Furmanek et al. | |
| 2017/0120263 A1 | 5/2017 | Needham et al. | |
| 2017/0122268 A1 | 5/2017 | Hashimoto et al. | |
| 2017/0284556 A1 | 10/2017 | Omekanda et al. | |

OTHER PUBLICATIONS

International Search Report and Written Opinion in connection with International Application PCT/US2018/045160, dated Nov. 21, 2018, 13 pages.

International Preliminary Report on Patentability issued from the International Preliminary Examining Authority in connection with International Application No. PCT/US2018/045160, dated Oct. 15, 2019, 7 pages.

\* cited by examiner

SYSTEM AND METHOD FOR ENERGIZING A SOLENOID COIL FOR FAST SOLENOID ACTUATION

CROSS-REFERENCE TO RELATED APPLICATIONS

This application claims priority to U.S. Provisional Patent Application Ser. No. 62/736,272, filed on Sep. 25, 2018, the disclosure of which is hereby incorporated by reference in its entirety.

FIELD

The present disclosure relates generally to apparatus and methods for dispensing fluid and, more particularly, to a drive circuit for operating a solenoid valve.

BACKGROUND

In the agricultural industry, agricultural fluids or agrochemicals are commonly applied to plants and/or plant precursors (e.g., seeds) for a variety of reasons. For example, plants and plant precursors are often sprayed with an agricultural fluid at the time of planting to enhance germination and early development. In other applications, liquid fertilizers, pesticides, and other agrochemicals may be applied to plants or crops after planting for crop management. Agricultural fluids include, without limitation, growth promotors, growth regulators, spray fertilizers, pesticides, insecticides, and/or fungicides.

Typically, systems for applying agricultural fluids to fields include a manifold, e.g., a boom pipe, and a plurality of nozzle assemblies that receive fluid from the manifold for applying the fluid to a field. In at least some known systems, the fluid is supplied to the manifold through an inlet located between opposed ends of the manifold. The fluid travels longitudinally through the manifold from the inlet toward the opposed ends. As the fluid flows towards the opposed ends, a portion of the fluid is directed out of the manifold towards the nozzle assemblies for application to the fields.

For some applications, it is desirable to regulate or control the fluid application rate (i.e., amount of fluid applied per unit area, such as an acre) and/or the fluid flow rate (i.e., volume per unit time) through the nozzle assemblies at a preset rate and/or based on user specified parameters. In some seed planting systems, for example, it may be desirable to dispense a consistent amount of fluid on or adjacent to each seed dispensed from the seed planting system.

In some systems, pulsing or pulse-width-modulated (PWM) valves are used to control delivery of fluid at a desired rate and/or time. Typically, the fluid is supplied by powered pumps to nozzles and/or other dispensers connected to a distribution conduit. In such systems, valves are connected along the distribution conduit and control discharge of the liquid from the distribution conduit and through the dispensers. The valves may be controlled individually or in groups and may be pulsed between different positions to control the flow rate and other flow characteristics.

Increasing concerns over inefficient agrochemical use, the cost of agrochemicals, and inadvertent spray drift or pesticide run-off have resulted in attempts to improve the quality, precision, accuracy, and reliability of application of agrochemicals. This has led to increased use of electronic control systems and individual control of spray nozzles or nozzle assemblies through use of solenoid valves. Consequently, the power necessary to operate the solenoid valves increases as the number of valves and size of the system increases.

Solenoid valves generally include a solenoid coil, or winding, within which a poppet translates to open and close an orifice. Typically, the poppet is biased by a spring to the closed position. In operation, a current is supplied to the coil to generate a magnetic field that induces a force on the poppet. The force on the poppet generally results in the solenoid valve's opening or holding a position against forces supplied by the spring and the pressure of fluid dispensed through the valve. Closing of the valve is generally achieved by the spring forces and pressure of the fluid overcoming the force generated by the solenoid coil. Solenoid valves in seed planting systems are typically operated to deliver an on/off pattern or a pulse width modulation (PWM) pattern of fluid through a given valve and nozzle assembly. Under ideal conditions, a PWM fluid delivery pattern would match a PWM control signal in pulse width and duty cycle, implying an instantaneous opening and closing of the valve. However, opening or closing of a solenoid valve is not instantaneous due to inertia, fluid drag, poppet friction, material properties, and inherent electrical characteristics of the solenoid coil, including the time-varying current relationship for a given voltage applied to an inductive coil, such as the solenoid coil, i.e., $V/L=\delta i/\delta t$. In other words, time is required to increase current conducted through the solenoid coil, i.e., coil current, to a level sufficient to generate the force necessary to control movement of the poppet.

In practice, such electrical characteristics skew the operational pulse width and duty cycle with which the solenoid valve operates with respect to an electrical pulse width and duty cycle that controls the solenoid valve. Likewise, the skew applies to the application of fluid itself.

Thus, a need currently exists for a system and process for rapid, precise, and predictable opening and closing of solenoid valves. Such a system and process is well suited for use in the agricultural field. It should be understood, however, that similar needs also exist in other fields. For example, on irrigation systems, in industrial spray driers, and in spray humidification or cooling systems. Specifically, a system that provides rapid and precise opening and closing of solenoid valves may find wide applicability in any system, whether commercial, industrial, or residential, that utilizes solenoid valves.

BRIEF DESCRIPTION

In one aspect, a drive circuit for operating a solenoid includes a main switch and a charge pump circuit. The main switch is coupled in series with a coil of the solenoid. The main switch is configured to selectively enable current flow from a voltage source according to a main switching signal to translate a poppet of the solenoid between an opened position and a closed position. The charge pump circuit is coupled to the voltage source. The charge pump circuit is configured to discharge through the coil to translate the poppet from the closed position to the opened position, and to charge when the poppet is held in the opened position.

In another aspect, a method of operating a drive circuit for a solenoid includes enabling discharge of a charge pump circuit coupled to a voltage source. The method includes enabling a first current to flow from the voltage source and the charge pump circuit through a coil of the solenoid to translate a poppet of the solenoid from a closed position to an opened position. The method includes modulating a second current to flow from the voltage source through the coil to hold the poppet in the opened position. The method includes charging the charge pump circuit after the poppet translates to the opened position.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

Corresponding reference characters indicate corresponding parts throughout the several views of the drawings.

DETAILED DESCRIPTION

Embodiments of the drive circuits and methods described herein utilize a charge pump circuit to reduce time delays in opening a solenoid valve by momentarily increasing the operating voltage of the solenoid coil when opening the valve. Given that the required force for translating the poppet of a solenoid valve is at its peak when translating from the closed position to the opened position, the necessary force for holding the poppet in the opened position is significantly reduced. Accordingly, in the embodiments described herein, the operating voltage of the solenoid valve is increased momentarily when opening the solenoid valve to reduce the time necessary to reach a coil current sufficient to translate the poppet to the opened position, thereby reducing the turn-on time delay. The coil current may then be reduced, e.g., by high-frequency pulse width modulation of the current signal supplied to the solenoid coil, when holding the poppet in the opened position to conserve power. Further, embodiments of the drive circuits and methods described herein utilize a switched flyback circuit to reduce power consumption in operating the solenoid valve by enabling reductions in duty cycle of the current signal supplied to the solenoid coil.

Figure 1:
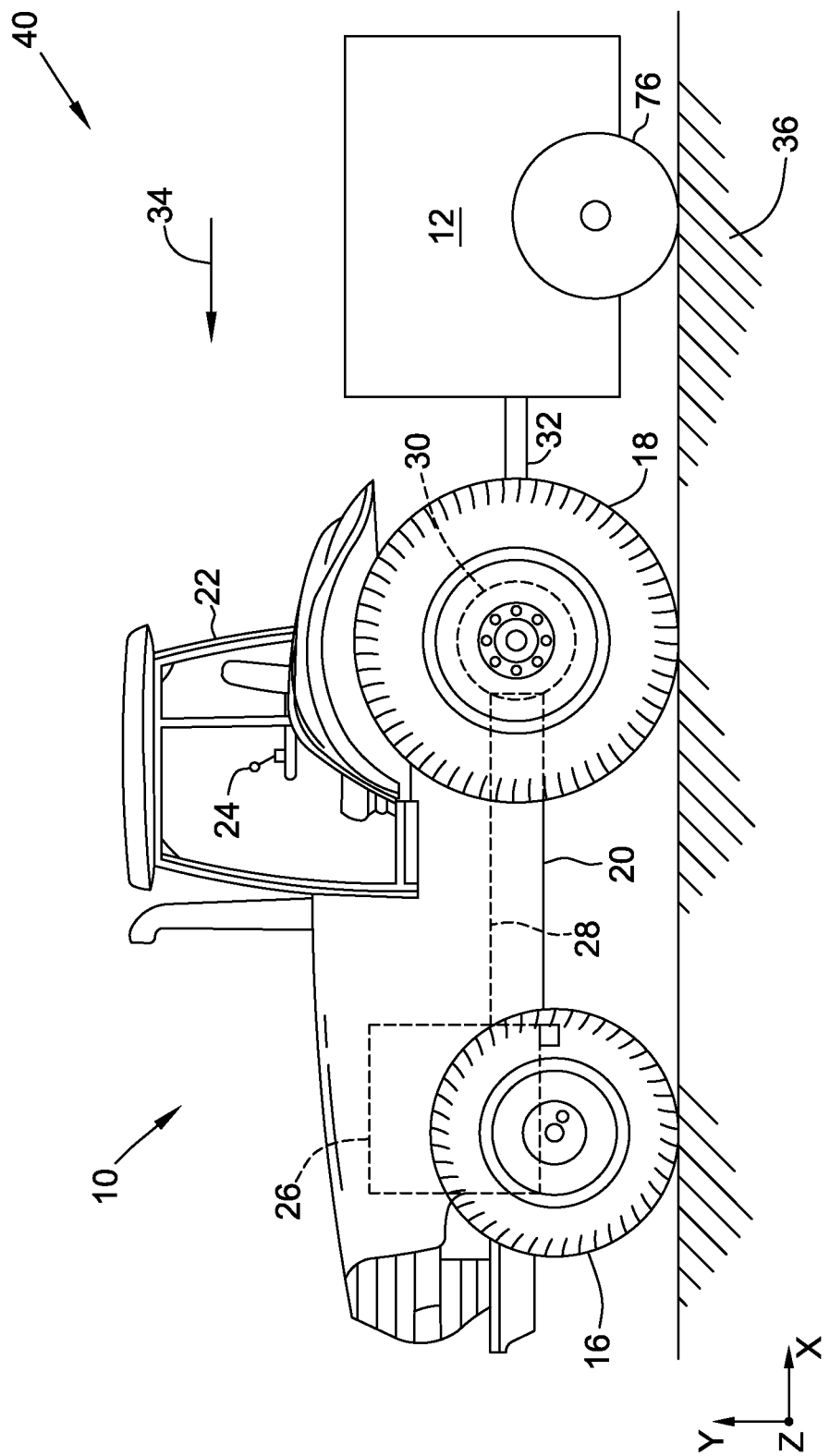
FIG. 1 is a perspective view of an example seed planting system.

Referring now to FIG. 1, one embodiment of a seed planting system is designated in its entirety by the reference number 40. Unless otherwise noted, directions, such as horizontal and vertical, refer to the orientation of the seed planting system 40 shown in FIG. 1.

The seed planting system 40 includes a motorized vehicle 10 and a planter 12 (shown schematically as a box in FIG. 1) for use in planting and spraying seeds. The motorized vehicle 10 is connected, fixedly or removably, to planter 12 and provides locomotion to seed planting system 40 and/or otherwise controls components of seed planting system 40. In the illustrated embodiment, motorized vehicle 10 is a tractor, although any other suitable vehicles or machines may be used to provide locomotion to seed planting system 40 and provide for control of seed planting system 40. In some embodiments, one or more components of the seed planting system 40 may be incorporated into the motorized vehicle 10 without departing from some aspects of this disclosure.

As shown in FIG. 1, the motorized vehicle 10 includes a pair of front wheels 16, a pair or rear wheels 18, and a chassis 20 connected to and supported by the wheels 16, 18. A cab 22 is supported by a portion of the chassis 20 and houses various control devices 24 for permitting an operator to control operation of the motorized vehicle 10. In some embodiments, control devices 24 may also permit control of planter 12. The motorized vehicle 10 also includes an engine 26 and a transmission 28 mounted on the chassis 20. The transmission 28 is operably connected to the engine 26 and provides variably adjusted gear ratios for transferring engine power to the wheels 18 and, in certain embodiments, wheels 16, via an axle/differential 30. Additionally, as shown in FIG. 1, the motorized vehicle 10 may be configured to be connected to planter 12 via a suitable coupling 32 such that vehicle 10 may pull planter 12 as it moves in a travel direction (indicated by arrow 34) along a field or ground 36. It should be understood that any other suitable vehicle or machine may be used to provide locomotion to seed planting system 40 and provide for control of seed planting system 40. In some embodiments, for example, vehicle 10 may include tracks instead of or in addition front wheels 16 and/or wheels 18. Additionally, in some embodiments, vehicle 10 may be an autonomous vehicle with no cab 22.

Figure 2:
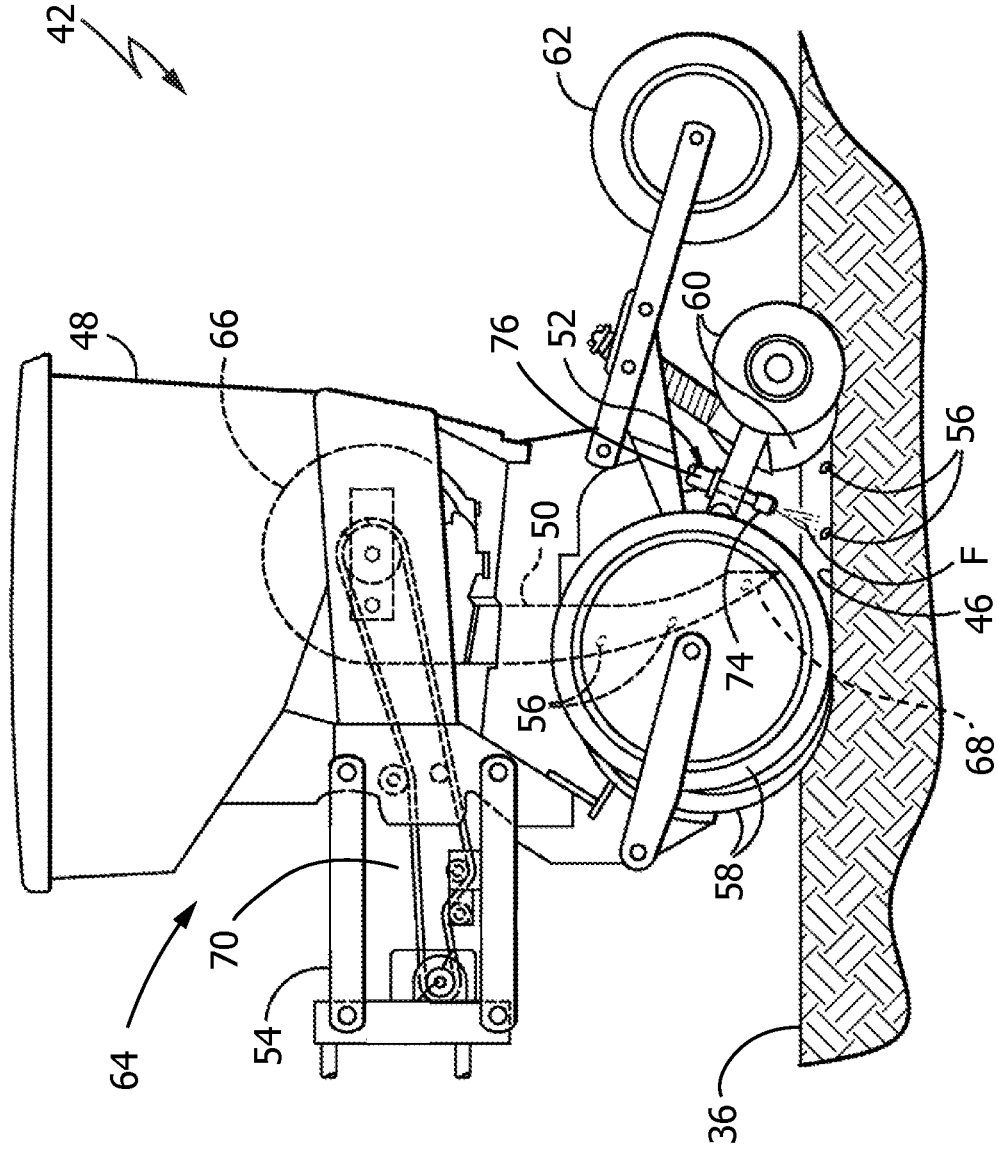
FIG. 2 is a side view of a portion of the seed planting system shown in FIG. 1.

Referring to FIG. 2, planter 12 includes a plurality of row units 42. Row units 42 are configured to at least spray a fluid on and/or adjacent to seeds and/or plants and, in some embodiments, are configured to plant seeds and spray the fluid on and/or adjacent to the seeds. In certain embodiments, seed planting system 40 further includes a controller 44 (shown in FIG. 3) for controlling row units 42. Controller 44 is located in a cab or other occupant space (e.g., cab 22) for the operator of seed planting system 40. In alternative embodiments, controller 44 is located remote from row units 42 and an associated vehicle and allows for remote control of row units 42. In yet other alternative embodiments, controller 44 or, more specifically, a plurality of controllers 44, are integrated into respective valve assemblies.

Row unit 42 is configured to create a furrow 46 using a furrow creation device, to meter and dispense seeds into the furrow 46 from a seed hopper 48 using a seed tube 50, and to spray a fluid F using a nozzle assembly 52. Row unit 42 may include any number of components such that row unit 42 performs these functions for a single row or a plurality of rows simultaneously. For example, in some embodiments, row unit 42 includes a plurality of furrow creation devices, seed tubes 50 fed from seed hoppers 48 (e.g., each seed hopper 48 fed from a single, shared master seed hopper, not shown), and nozzle assemblies 52 along the track of row unit 42 and planter 12. Planter 12 includes a frame 54 extending along the width of the planter 12 (e.g., in a direction transverse to the travel direction 34 of planter 12) that supports row units 42.

The furrow creation device of planter 12 is configured to create a trench or furrow 46 within the field or ground 36 for planting seeds 56. In several embodiments, the furrow creation device includes a pair of laterally spaced opening discs 58, a pair of laterally spaced closing discs 60 and a press wheel 62. The opening discs 58 are configured to open a furrow 46 within ground 36. Seeds 56 are deposited into the furrow 46 (e.g., by seed tube 50), and closing discs 60 are configured to close furrow 46 over seeds 56. Press wheel 62 is configured to compact the soil that has been closed over seeds 56. In alternative embodiments, furrow creation device may include other suitable components for creating furrow 46. In further alternative embodiments, planter 12 does not include a furrow creation device but rather plants and/or sprays in an existing furrow 46 (e.g., created by another machine).

Row unit 42 includes a seeder assembly 64 including seed hopper 48, a seed meter 66, and seed tube 50. Seed hopper 48, seed meter 66, and seed tube 50 are configured to dispense seeds 56 into furrow 46. For example, seed hopper 48 is any suitable container or other storage device configured for storing and dispensing seeds 56 into seed meter 66. Seed meter 66 is any suitable seed meter configured to dispense seeds 56 into seed tube 50 at a metered rate. In one embodiment, seed meter 66 includes a housing and a seed plate or disc rotatably supported within the housing. The seed disc includes a plurality of indentions, channels and/or other suitable recessed features that are spaced apart from one another around the seed disc (e.g., in a circular array) to allow seeds 56 to be dispensed at a given frequency. Specifically, each recessed feature is configured to grab a single seed 56 (e.g., via a vacuum applied to the recessed feature) as such recessed feature is rotated past the location at which seeds 56 are fed into the housing from seed hopper 48. As the seed disc is rotated, seeds 56 are carried by the recessed features and dispensed into seed tube 50. The metered rate may be predetermined, set, changed, or otherwise controlled (e.g., by the control system of planter 12 or mechanically based on a rate of travel of row unit 42). Seeds 56 are dispensed from an outlet 68 of seed tube 50 into furrow 46. For example, at a given rotational speed for the seed disc, the seed meter 66 dispenses seeds 56 at a constant frequency. When planter 12 travels at a constant speed, seeds 56 are spaced apart equally from one another within furrow 46. As the travel speed of the planter 12 increases or decreases, the rotational speed of the seed disc must also be increased or decreased to maintain equal spacing or a predetermined spacing of seeds 56 within the furrow 46. Such variation of the rotational speed of the seed disc is provided by a drive system 70 and/or controller 44.

Drive system 70 is or includes any suitable device and/or combination of devices configured to rotate the seed disc of seed meter 66. An example of a suitable drive system is described, for example, in U.S. Pat. No. 9,226,442, issued Jan. 5, 2016, which is hereby incorporated by reference in its entirety.

Figure 3:
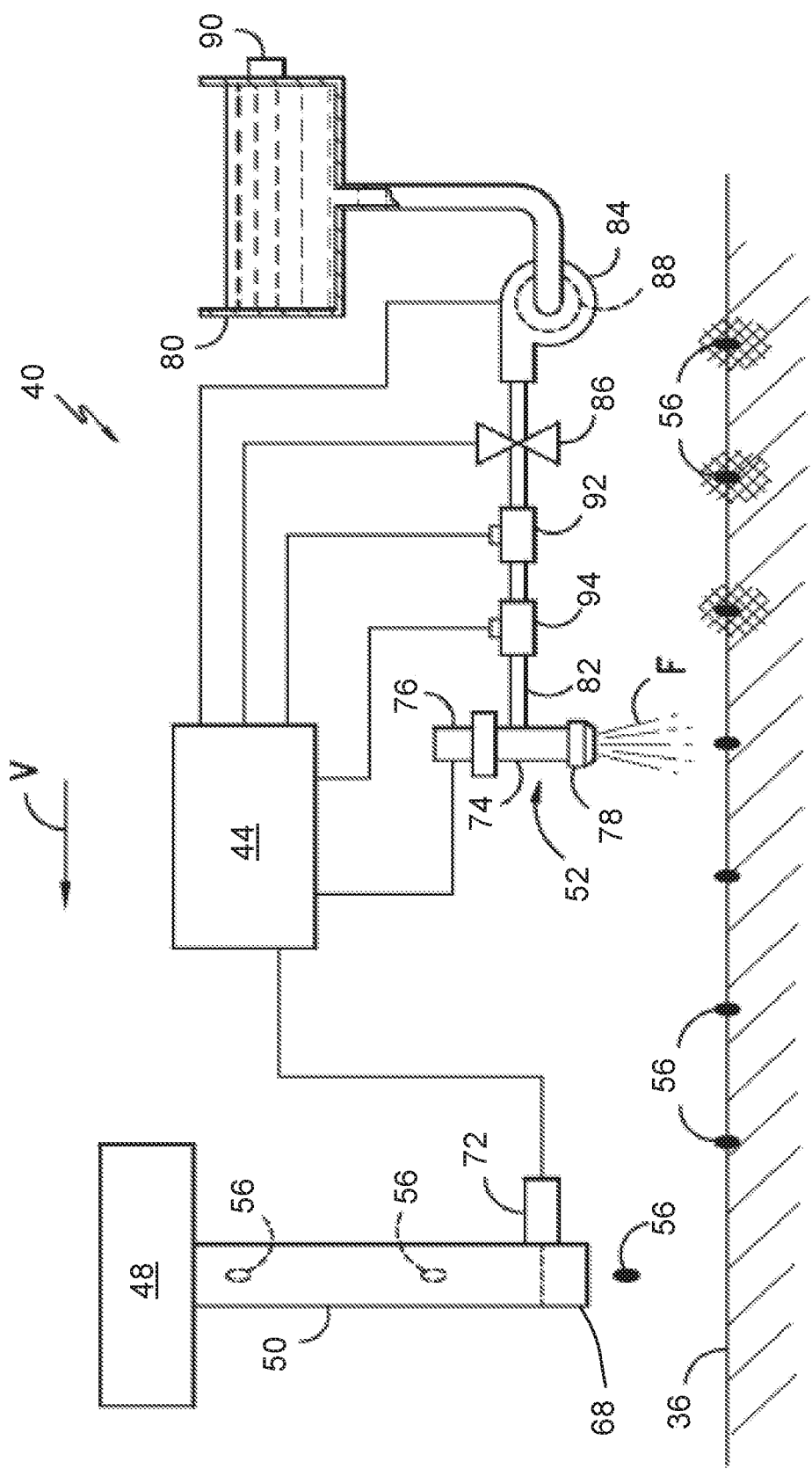
FIG. 3 is a schematic view of a portion of the seed planting system shown in FIGS. 1 and 2.

With additional reference to FIG. 3, each row unit 42 further includes a seed sensor 72 operatively connected to the seed tube 50 for detecting each seed 56 as it drops through the seed tube 50. Suitable seed sensors may include optical sensors and/or any other suitable object sensor known in the art. The seed sensor 72 may be communicatively connected to controller 44 such that, each time the seed sensor 72 detects a seed 56 dropping through the seed tube 50, a signal may be transmitted from the seed sensor 72 to the controller 44.

In alternative embodiments, row unit 42 is or includes other suitable components for dispensing seeds 56. In further alternative embodiments, seed planting system 40 does not include seed hopper 48, seed meter 66, seed tube 50, seed sensor 72, or other components for dispensing seeds 56, and instead sprays existing seeds 56 or existing plants. In such embodiments, row unit 42 does not include seeder assembly 64.

Each row unit 42 further includes at least one nozzle assembly 52 configured to spray fluid F. Seed planting system 40 includes a plurality of row units 42, and thus, a plurality of nozzle assemblies 52. Each nozzle assembly 52 is located proximate to a respective one of the plurality of seed tube outlets 68 and is configured to spray fluid F, or a combination of fluids, on, adjacent to, or otherwise in relation to seeds 56 dispensed by seed tube 50 or existing plants. Nozzle assembly 52 includes a spray nozzle 74 and a valve 76 (e.g., a solenoid valve). Nozzle 74 is any suitable spray nozzle suitable for an agricultural spraying system. In some embodiments, for example, valve 76 may be configured as a latching solenoid valve, a two-way normally closed valve, a two-way normally open valve, a direct acting valve, a pilot actuated solenoid valve, a flipper solenoid valve and/or the like. Valve 76 is configured to be mounted to and/or integrated within a portion of spray nozzle 74 or nozzle assembly 52 using any suitable mounting configuration and/or any other suitable configuration that permits control of the flow of fluid F through the nozzle 74. For example, valve 76 is a solenoid valve positioned relative to spray nozzle 74 and controlled by controller 44 such that flow of fluid F through spray nozzle 74 is modified using pulse-width-modulation (PWM) control of valve 76. In other embodiments, valve 76 may be located remote from nozzle 74. In some embodiments, for example, valve 76 may be mounted or connected to the boom pipe or manifold used to supply fluid to nozzle assemblies 52. In some embodiments, nozzle assembly 52 also includes a spray tip 78 (shown in FIG. 3), such as a flat fan tip, cone tip, straight stream tip and/or any other suitable spray tip known in the art, connected to spray nozzle 74 and configured to produce a desired spray pattern.

Fluid F is supplied to nozzle assembly 52 from any suitable fluid source, such as a fluid tank 80, via a fluid supply line 82, such as a boom pipe, manifold, or other suitable flow conduit. Each nozzle assembly 52 is connected in fluid communication with fluid supply line 82 to receive fluid therefrom. In the illustrated embodiment, a pump 84, such as a centrifugal pump or positive displacement pump, is positioned upstream of the nozzle assembly 52 (specifically, between fluid tank 80 and fluid supply line 82) for pumping fluid F from the fluid source to the nozzle assembly 52. Pump 84 pressurizes the fluid supply line 82 with fluid from fluid tank 80, and nozzle assembly 52 and/or valves 76 controls flow of the pressurized fluid through spray nozzle 74. In some embodiments, row unit 42 includes a plurality of nozzle assemblies 52 for spraying fluid in parallel rows. In further embodiments, a single nozzle assembly 52 is configured to spray fluid in two or more parallel rows. In still further embodiments, row unit 42 includes a plurality of nozzle assemblies 52 positioned to spray a single row (e.g., furrow). For example, each nozzle assembly 52 may spray a different fluid and may be controlled, by controller 44, together or individually (e.g., allowing for different spray band lengths and/or offset distances from seeds 56).

As shown in FIG. 3, valve 76 is communicatively connected to controller 44. Controller 44 is configured to transmit a suitable control signal to valve 76 to cause it to open, remain open for a calculated duration, and close, thereby spraying a metered amount of fluid F on and/or adjacent to seed 56.

It should be appreciated that controller 44 may be configured to determine when to open and close valve 76 by analyzing various operating parameters of system 40, which may be pre-stored within the controller's memory and/or received by controller 44 as an input. Such operating parameters may include, but are not limited to, the vertical distance each seed 56 falls between seed sensor 72 and ground 36, the horizontal distance between the outlet of seed tube 50 and nozzle assembly 52, the speed V of system 40 and/or any other suitable operating parameters. Based on such analysis, controller 44 may be configured to calculate a suitable time delay for actuating valve 76 (i.e., the amount of time between the when seed sensor 72 detects a seed 56 and when valve 76 needs to be opened to spray fluid F on and/or adjacent to each seed 56).

In addition to determining the time delay for actuating valve 76, controller 44 may also be configured to control the operation of valve 76 such that a specific volume of fluid F is applied on and/or adjacent to each seed 56. Specifically, in several embodiments, the controller 44 may be configured to analyze one or more operating parameters of system 40 in order to determine the duration of the valve pulse (i.e., the amount of time valve 76 is opened) needed to achieve a desired spray volume for each seed 56. Such operating parameters may include, but are not limited to, the pressure of the fluid F supplied to valve 76, the valve configuration (e.g., the sizes of the inlet and/or outlet of valve 76), the nozzle configuration (e.g., the spray tip orifice size), the speed V of system 40, fluid density, and/or any other suitable operating parameters. By analyzing such operating parameters, controller 44 may be configured to control the duration of the valve pulse in a manner that allows the same amount fluid F to be sprayed on and/or adjacent to each seed 56.

Alternatively, controller 44 may be configured to implement a fixed application approach, wherein valve 76 is operated at a constant pulse duration. In such an embodiment, the specific volume of fluid F applied on and/or adjacent to each seed 56 may generally vary depending on the speed V of the system 40 and/or the pressure of the fluid F supplied to valve 76.

Additionally, in some embodiments, controller 44 may also be configured to control a flow rate of the fluid F supplied to valve 76 by controlling the operation of a suitable flow regulating valve 86. For example, controller 44 may be configured to determine the flow rate of the fluid F supplied through the fluid supply line 82 based on inputs received from one or more suitable meters and/or sensors positioned upstream of the valve 76, such as one or more turbine meters 88 associated with the pump 84, one or more tank level meters 90 associated with the fluid source 80, one or more flow meters 92 associated with the fluid supply line 82, one or more pressure sensors 94 and/or the like. In addition, controller 44 may also be configured to receive user inputs corresponding to a desired flow rate for the system 40. Accordingly, based on such inputs, controller 44 may be configured to control the operation of flow regulating valve 86 so as to maintain the fluid F supplied to valve 76 at the desired flow rate.

Further, in some embodiments, controller 44 may also be configured to control the pressure of the fluid F supplied to valve 76. For example, one or more pressure sensors 94 may be configured to monitor the pressure of the fluid F and transmit pressure measurements to controller 44. Moreover, controller 44 may be configured to control system pressure for all row units 42 based on speed using pulse-width modulation, inline servo-valves, bypass servo valves, or any other suitable means. Controlling system pressure based on speed enables, for example, control of concentration (ml/in) of fluid applied to ground 36.

Controller 44 may generally comprise any suitable computer and/or other processing unit, including any suitable combination of one or more of computers, processing units and/or the like that may be operated independently or in connection within one another. Thus, in several embodiments, controller 44 may include one or more processor(s) and associated memory device(s) configured to perform a variety of computer-implemented functions including, but not limited to, the functions disclosed herein. As used herein, the term "processor" refers not only to integrated circuits, but also refers to a microcontroller, a microcomputer, a programmable logic controller (PLC), an application specific integrated circuit, and other programmable circuits. Additionally, the memory device(s) of controller 44 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure and/or cause the associated controller to perform various functions including, but not limited to, controlling one or more operating parameters of the nozzle assemblies 52 (e.g., duty cycle and/or pulse duration) to control fluid flow through system 40.

In some embodiments, controller 44 may be configured to calculate a flow rate (e.g., gallons per minute) and/or an application rate (e.g., gallons per acre) of fluid flow through system 40 based on system operating parameters. In some embodiments, for example, controller 44 may be configured to calculate a flow rate through fluid supply line 82 based on a sensed pressure of fluid within fluid supply line 82, flow coefficients (Cv) or sizes associated with orifices of each nozzle assembly 52, such as a valve outlet orifice, a spray outlet or spray tip orifice, and a return line orifice, the density of fluid being applied by system 40, and the duty cycle at which valve 76 of each nozzle assembly 52 is being operated.

Controller 44 may be configured to determine a flow rate of fluid being dispensed through the spray outlet of each nozzle assembly 52. In certain embodiments, the combined flow rate for the entire system is measured by a flowmeter, and the flow rate of each valve 76 is determined based on the DC signal supplied to each valve 76 and the number of valves 76. Alternatively, controller 44 may be configured to calculate the flow rate through each individual nozzle assembly 52 based on, for example, pressure, orifice dimensions, material properties, and duty cycle, and sum the individual flow rates to determine the combined flow rate of fluid being dispensed through the spray outlet of the entire system.

Controller 44 may also be configured to calculate an overall application rate of fluid being applied by system 40 based on the calculated combined flow rate, a travel speed of system 40, and a boom width or effective spray width of system 40. For example, controller 44 may divide the calculated combined flow rate by the travel speed of system, and multiply the resulting value by the boom width or effective spray width of system 40 to calculate the overall application rate of system.

Controller 44 may receive real-time operating parameters of system 40 from valves 76 and one or more sensors or meters of system, such as turbine meter 88, tank level meter 90, flow meter 92, and pressure sensor 94. Other system parameters, such as flow coefficients, orifice sizes, fluid density, boom width, and effective spray width, may be input to controller 44 via a suitable user interface.

The system 40 of FIGS. 1-3 is provided by way of example only. In other embodiments, system 40 may have any other suitable configuration that enables system 40 to function as described herein. Additionally, system 40 is not limited to any particular number or configuration of nozzle assemblies 52.

Figure 4:
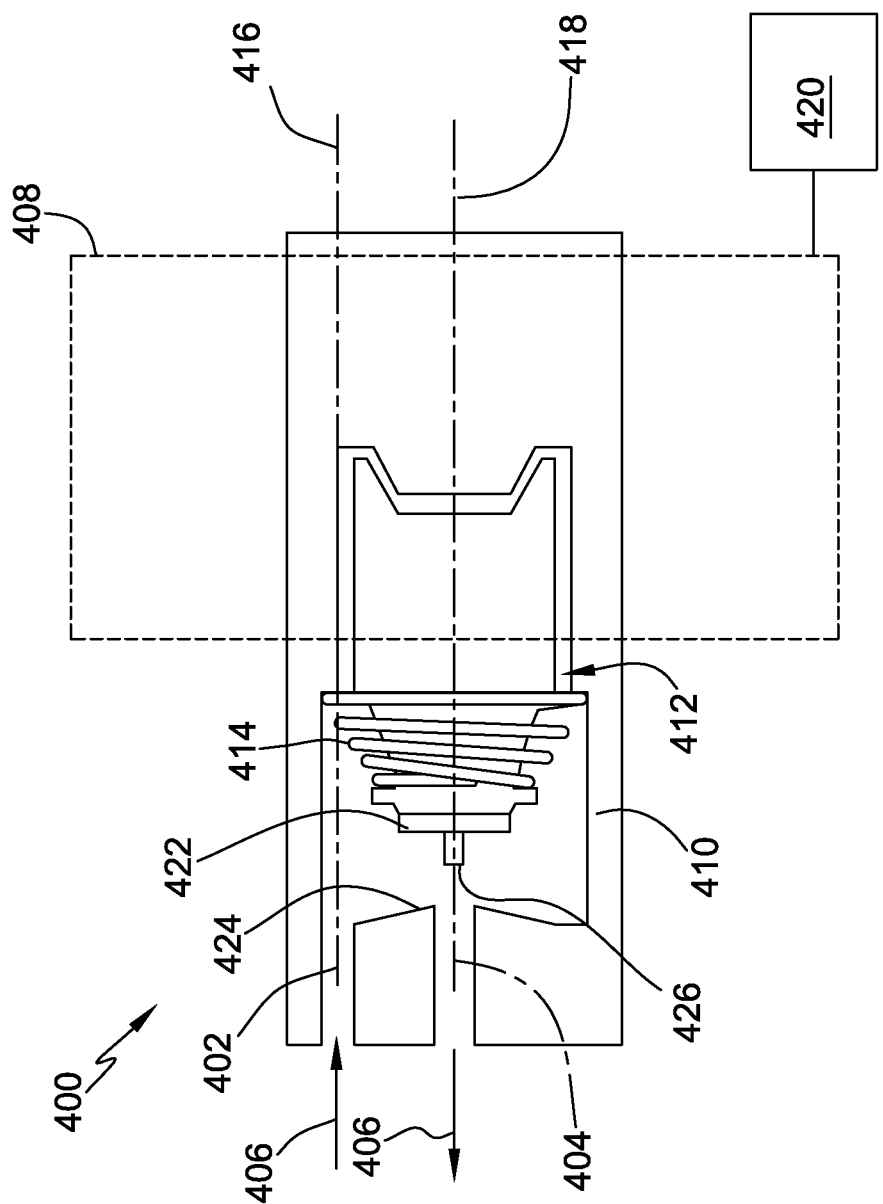
FIG. 4 is a sectional view of a portion of an example valve assembly suitable for use in the nozzle assembly shown in FIGS. 2 and 3.

FIG. 4 is a simplified, cross-sectional view of an example electric solenoid valve 400 suitable for use in nozzle assembly 52 shown in FIGS. 2 and 3. In general, valve 400 includes an inlet 402 and an outlet 404 for receiving and expelling fluid 406 from valve 400. Valve 400 also includes a solenoid coil 408 (shown in dashed lines) located on and/or around a guide 410. For instance, in one embodiment, solenoid coil 408 is wrapped around guide 410. Additionally, an actuator or poppet 412 is movably disposed within guide 410. In particular, poppet 412 may be configured to be linearly displaced within guide 410 relative to inlet 402 and/or outlet 404 of valve 400. Moreover, as shown, valve 400 includes a spring 414 coupled between guide 410 and poppet 412 for applying a force against poppet 412 in the direction of outlet 404. It should be appreciated that valve 400 may also include a valve body or other outer covering (not shown) disposed around coil 408.

As shown in the illustrated embodiment, valve 400 is configured as a counter flow valve. Thus, fluid 406 may enter valve 400 through inlet 402 along an axis 416 and exit valve 400 through outlet 404 along an axis 418. Poppet 412 may be configured to be linearly displaced within guide 410 along axis 418 such that fluid 406 may generally be directed out of valve 400 along axis 418. In other embodiments, valve 400 may have any configuration that enables seed planting system 40 to function as described. For example, in some embodiments, valve 400 is configured as an in-line valve. In other words, fluid may be configured to enter and exit valve 400 along a common axis.

In addition, solenoid coil 408 may be communicatively coupled to a controller 420 configured to regulate or control the current provided to coil 408. Controller 420 may include one or more modules or devices, one or more of which is enclosed within valve 400, enclosed within nozzle assembly 52, or may be located remote from nozzle assembly 52. Controller 420 may generally comprise any suitable computer and/or other processing unit, including any suitable combination of computers, processing units, and/or the like that may be communicatively coupled to one another (e.g., controller 420 may form all or part of a controller network). Thus, controller 420 may include one or more processor(s) and associated memory device(s) configured to perform a variety of computer-implemented functions (e.g., performing the methods, steps, calculations, and/or the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit (ASIC), a digital signal processor (DSP), a field programmable gate array (FPGA), and other programmable circuits. Additionally, the memory device(s) of controller 318 may generally comprise memory element(s) including, but not limited to, non-transitory computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure controller 420 to perform various functions including, but not limited to, controlling the current supplied to solenoid coil 408, monitoring inlet and/or outlet pressures of the disclosed valve(s), monitoring poppet operation of the disclosed valves, receiving operator inputs, performing the calculations, algorithms and/or methods described herein and various other suitable computer-implemented functions.

Coil 408 may be configured to receive a controlled electric current or electric signal from controller 420 such that poppet 412 may move within guide 410 relative to outlet 404. For example, in one embodiment, controller 420 includes a square wave generator, a coil drive circuit, or any other suitable device that is configured to apply a regulated current to coil 408, thereby creating a magnetic field which biases (by attraction or repulsion) poppet 412 away from outlet 404. As a result, poppet 412 may be moved between a closed position and an opened position. One exemplary seed planting system may operate valves, such as valve 400, at about 10 Hertz, i.e., a given solenoid valve is opened every 100 milliseconds (ms) according to a valve-pulsing PWM signal. For certain operating pressures, the solenoid valve may take about 6 ms to open from the time coil 408 is energized, and about 4 ms to close from the time coil 408 is de-energized. For the remainder of the 100 ms period, the solenoid valve maintains the poppet in the opened or closed position, otherwise referred to as idle time. Typically, when a solenoid valve is activated, i.e., opened and held open, the solenoid coil is energized continuously and, conversely, when the solenoid valve is deactivated, i.e., closed and held close, the solenoid coil is de-energized. Alternatively, the frequency and duty cycle of the current conducted through the solenoid coil may be regulated to continuously conduct current through the solenoid coil while maintaining control of the desired valve-pulsing PWM signal.

In some embodiments, coil 408 may be driven with a complex pulsed voltage, or PWM waveform. A "pulse" may correspond to a duration (e.g., a 100 millisecond cycle) in which a low frequency duty cycle value sets the amount of on/off time. The "on" time may correspond to a "coil discharging (or charging) period" in which the drive voltage is turned off (or on) continuously and a "modulated period" in which the voltage is turned on and off at a high frequency (e.g., at a frequency of greater than 200 Hz). The duration of the coil discharging (or charging) period may be determined by the amount of time for the coil current to reach the desired value. The coil current may be continuously measured and compared to a threshold to trigger switching of the drive voltage to a modulated signal. Controller 420 may use a stored threshold and/or a threshold determined based on operating parameters of seed planting system 40 (shown in FIG. 1). For example, in some embodiments, the threshold may change during operation of seed planting system 40 based on information from a sensor that detects a position of poppet 412. In further embodiments, the threshold is determined based on the fluid pressure against poppet 412 and the current required to move poppet 412 to the open position and/or to move poppet 412 to the closed position.

In several embodiments, when valve 400 is being pulsed, the movement of poppet 412 may be cycled between the opened position and a closed, or sealed, position, wherein poppet 412 is sealed against outlet 404. Thus, as shown in FIG. 4, poppet 412 may also include one or more rubber disks or other suitable sealing members 422 that is configured to be pressed against outlet seat 424 of outlet 404 to create a leak-free seal when valve 400 is in the sealed position. A projection 426 extending from sealing member 422 may be received in outlet 404 when valve 400 is in the sealed position.

Figure 5:
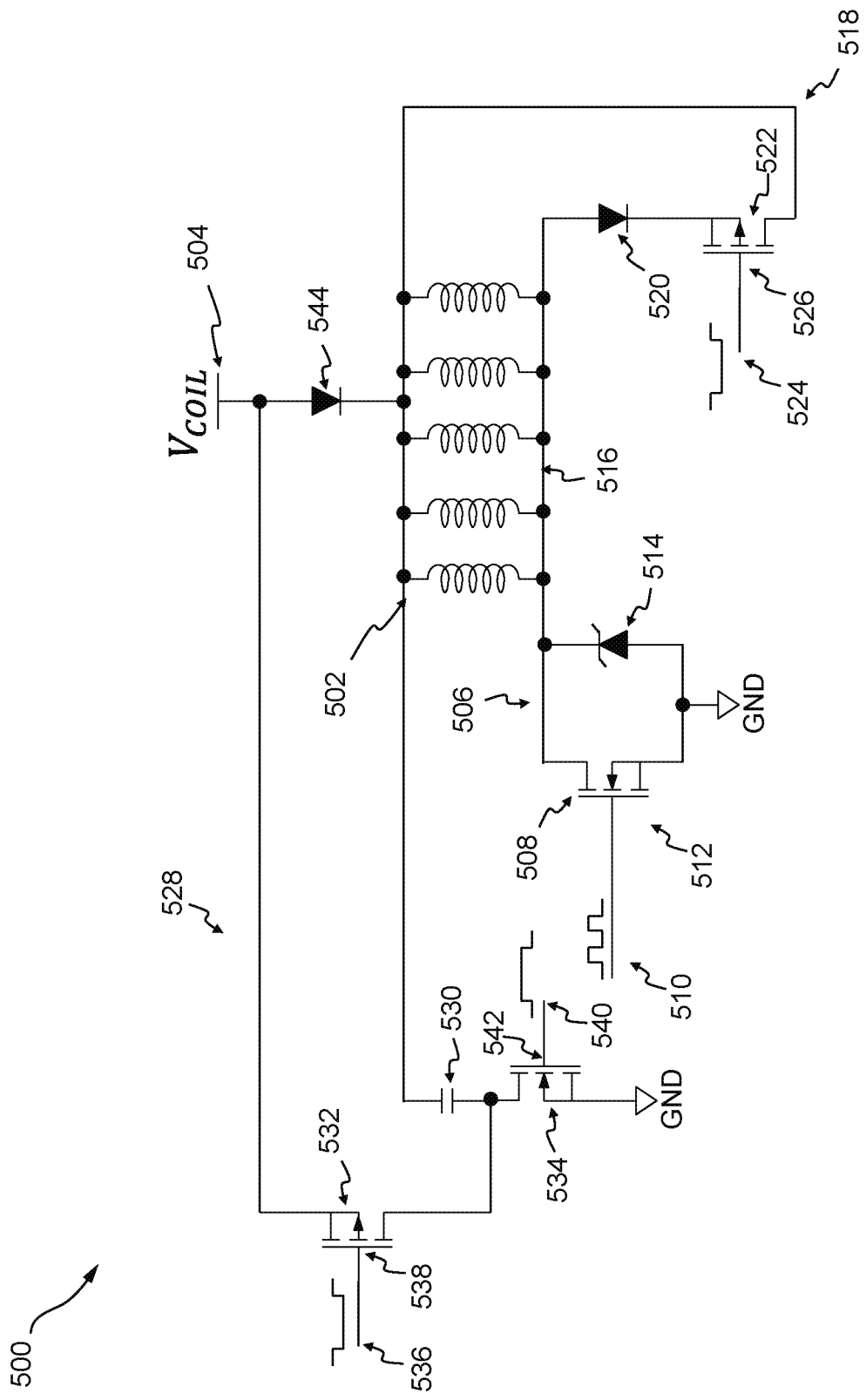
FIG. 5 is a schematic diagram of a drive circuit for use in operating a group of solenoids.

FIG. 5 is a schematic diagram of a drive circuit 500 for use in operating a group of solenoids or solenoid valves, such as, for example, solenoid valve 400, shown in FIG. 4. Drive circuit 500 is configured to operate one or more valves (not shown) by generating a current signal, or waveform, for energizing respective solenoid coils of the one or more valves. The valves and, more specifically, their respective solenoid coils 502 are supplied a coil voltage (Vcoil), from coil voltage supply 504, and a ground path 506 for the one or more valves. Generally, when ground path 506 is closed, solenoid coils 502 conduct coil currents from coil voltage supply 504 to GND.

Ground path 506 is opened and closed by a field effect transistor (FET) 508. FET 508 may be controlled directly or by a gate driver circuit (not shown) in response to a gate signal 510. In the embodiment of FIG. 5, FET 508 is illustrated as being controlled directly by gate signal 510.

Gate signal 510 is applied to a gate 512 of FET 508 to control, or gate, FET 508. In certain embodiments, gate signal 510 is a simple logic-level signal that applies a high (or low) logic level to gate 512 to make FET 508 conduct the coil current when the solenoid valve should open. Likewise, in such an embodiment, gate signal 510 applies a low (or high) logic level to gate 512 to make FET 508 open the circuit and de-energize solenoid coils 502.

In other embodiments, gate signal 510 is pulse-width modulated (PWM) with a certain duty cycle and at a certain frequency to supply a desired amount of current to solenoid coils 502. For example, a 100% duty cycle gate signal 510 may be applied to gate 512 to transition the solenoid valves from a closed position to an opened position, i.e., to translate the poppet from the closed position to the opened position. A 0% duty cycle gate signal 510 is applied to gate 512 (or gate signal 510 is removed entirely) to transition the solenoid valve from the opened position to the closed position. Further, gate signal 510 is modulated to a high frequency and a low duty cycle when the solenoid valve is being held in the opened position after transitioning from the closed position. In certain embodiments, when the solenoid valve is being held in the closed position, gate signal 510 may be modulated to a low frequency and low duty cycle to maintain a level of coil current above zero, but below the threshold at which the valve poppet would translate from the closed position to the opened position, thereby improving responsiveness of the valve to an "open" command.

FET 508 generally enables fast turn-on and is capable of sinking coil currents conducted by solenoid coils 502. FET 508 may be a power metal-oxide semiconductor field-effect transistor (MOSFET), an insulated gate bipolar transistor (IGBT), or other solid state device suitable for switching the coil current. Gate signal 510 may be provided, in certain embodiments, by controller 420 or any other suitable controller or digital circuit.

Drive circuit 500 includes a protection diode 514 connected in parallel to FET 508. Protection diode 514 is configured to protect FET 508 from excessive voltage buildup across the terminals of FET 508 when FET 508 is opened, or when periodically switching the coil current. More specifically, when switching the coil current off, a back electromotive voltage, or "electromotive force" (EMF), develops at a node 516 that "opposes" the change in current in solenoid coil 502, i.e., to decay to zero. Protection diode 514 provides an alternative path to GND for the coil current that dissipates the energy stored in solenoid coil 502, thereby preventing an excessive voltage buildup on node 516. Protection diode 514 may be, for example, a Zener diode having a high breakdown voltage of about 28 volts. Protection diode 514 should be selected to have a breakdown voltage sufficiently low to protect FET 508 from a voltage that could saturate or damage FET 508, while also being high enough to not disrupt normal operation of drive circuit 500 when FET 508 is closed and coil current is conducted, or when FET 508 is opened and coil current is conducted through protection diode 514.

Drive circuit 500 includes a flyback circuit 518 connected in parallel to solenoid coils 502. Flyback circuit 518 slows the dissipation of coil currents from solenoid coils 502 when FET 508 is switched at a high frequency. By slowing the dissipation, or decay, flyback circuit 518 enables the coil current to remain substantially constant, and above a threshold at which the one or more valves would close, when switching FET 508 at a high frequency and suitable duty cycle, e.g., when the valve is being held in the opened position by a high frequency PWM gate signal 510. Flyback circuit 518 includes a diode 520 coupled in series with a MOSFET 522, and flyback circuit 518 is coupled in parallel with solenoid coils 502. When enabled, diode 520 "freewheels" the coil current in solenoid coils 502 when FET 508 is open and energy dissipates from solenoid coils 502. Diode 520 is a low forward voltage diode, such as a Schottky diode or a germanium diode. Low-forward voltage diodes generally have a forward voltage in a range of about 150 millivolt to 450 millivolt. In alternative embodiments, diode 520 is a typical silicon diode or other diode having a forward voltage of about 0.7 millivolt or higher, although such an embodiment may not perform as well. Generally, the rate at which solenoid coils 502 discharge their stored energy is directly related to a voltage drop across a given coil, which is further a function of the back EMF generated to force current to conduct through protection diode 514 or diode 520. Accordingly, the lower the forward voltage of diode 520, the lower the voltage drop across solenoid coils 502, and the slower energy is dissipated from solenoid coils 502. In other words, a lower forward voltage enables a slower dissipation of the coil energy and, consequently, a more-steady coil current as FET 508 is switched at a high frequency.

MOSFET 522 enables and disables flyback circuit 518 by closing and opening the "free-wheeling" path for the coil current to dissipate from node 516 through diode 520. Flyback circuit 518, in certain embodiments, may further include a gate driver circuit (not shown) for gating MOSFET 522. Alternatively, as shown in FIG. 5, MOSFET 522 is enabled and disabled directly by a flyback control signal 524 applied at a gate 526 of MOSFET 522.

Flyback control signal 524 may be supplied, in certain embodiments, by controller 420 or any other suitable controller or digital circuit. Generally, flyback control signal 524 enables flyback circuit 518 when the one or more valves and, more specifically, solenoid coils 502 are being supplied a high frequency PWM current signal by FET 508, such as, for example, when the one or more valves are being held in the opened position. While enabled, flyback circuit 518 and, more specifically, diode 520 slow the decay of the coil current from solenoid coils 502, further enabling the reduction of the power supplied to solenoid coils 502, i.e., the duty cycle of gate signal 510. Likewise, flyback control signal 524 disables flyback circuit 518 when the coil currents in solenoid coils 502 should be dissipated quickly, such as, for example, when the one or more valves are transitioning from the opened position to the closed position. When flyback circuit 518 is disabled, protection diode 514 directs the current to GND. Generally, flyback circuit 518 may be enabled or disabled when transitioning the valve from the closed position to the opened position using a 100% duty cycle gate signal 510, because solenoid coils 502 are charging and FET 508 provides a low-impedance path to GND.

Drive circuit 500 includes a charge pump circuit 528. Charge pump circuit 528 includes a capacitor 530 that is selectively coupled in parallel or in series with coil voltage supply 504 by MOSFET 532 and MOSFET 534. Generally, MOSFET 532 couples capacitor 530 in series with coil voltage supply 504 when "discharging" the charge pump, i.e., discharging capacitor 530. When discharging, MOSFET 534 is open, or not conducting, and the potential across capacitor 530 adds to Vcoil supplied by coil voltage supply 504, thereby momentarily increasing the voltage applied to solenoid coils 502, or the "operating voltage" of solenoid coils 502.

MOSFET 534 couples capacitor 530 in parallel with coil voltage supply 504 when "charging" the charge pump, i.e., charging capacitor 530. When charging, MOSFET 534 is closed, or conducting, to enable current to flow through capacitor 530 to GND. When charging, MOSFET 532 is open, or not conducting, to avoid a short circuit from coil voltage supply 504 to GND.

MOSFET 532, in the embodiment of FIG. 5, is illustrated as a P-FET, although, in alternative embodiments, MOSFET 532 may be implemented with an N-FET or other suitable switching device. Likewise, MOSFET 534 is illustrated as an N-FET, but could be implemented with a P-FET or other suitable switching device in alternative embodiments.

MOSFET 532 is operated by a discharge signal 536 applied to a gate 538 of MOSFET 532. Similarly, MOSFET 534 is operated by a charge signal 540 applied to a gate 542 of MOSFET 534. Discharge signal 536 and charge signal 540, in certain embodiments, may be logic-level signals generated by, for example, controller 420. In alternative embodiments, discharge signal 536 and charge signal 540 are generated by one or more gate driver circuits (not shown).

Generally, when MOSFET 532 is closed, MOSFET 534 is opened to avoid shorting coil voltage supply 504 to GND. Instead, with MOSFET 534 opened and MOSFET 532 closed, capacitor 530 is coupled in parallel with a diode 544, and further coupled in series with coil voltage supply 504 and solenoid coils 502. Diode 544 is a low forward voltage diode, such as a Schottky diode or a germanium diode. Diode 544 provides a high-impedance path from coil voltage supply 504 to solenoid coils 502 relative to the path through capacitor 530. Diode 544 also blocks current sourced from capacitor 530 from conducting back to coil voltage supply 504. Accordingly, Vcoil and the potential across capacitor 530 momentarily add together and are applied to solenoid coils 502 when transitioning the solenoid valves from the closed position to the opened position. The resulting higher-voltage applied to solenoid coils 502 produces a larger rate-of-change of current, (di/dt), conducted through each of solenoid coils 502, further resulting in a faster opening time by more quickly achieving a sufficient coil current to overcome the closing force on the poppet and translate the poppet from the closed position to the opened position. In certain embodiments, the combined voltage of coil voltage supply 504 and capacitor 530 is applied immediately when gate signal 510 initiates opening of the valve. In other embodiments, only Vcoil is applied initially, and the combined voltage of coil voltage supply 504 and capacitor 530 is applied one or more milliseconds later. In certain embodiments, capacitor 530 may be discharged for 4 to 6 milliseconds. In other embodiments, capacitor 530 is discharged for 10 to 20 milliseconds. Moreover, capacitor 530 may be discharged at differing times during the translation of the poppet from the closed position to the opened position based on the goals of a particular embodiment of drive circuit 500. In some embodiments, capacitor 530 may be coupled in series with coil voltage supply 504 for 20 milliseconds or more. Generally, the time necessary to translate the poppet from the closed position to the opened position varies, for example, for different sizes of valves, different solenoid coils, different operating voltage levels, and different operating fluid pressure levels across the one or more solenoid valves.

Once the poppet has translated to the opened position, MOSFET 532 may be opened to enable capacitor 530 to be charged when MOSFET 534 is subsequently closed. Generally, capacitor 530 may be charged at any time other than when discharging. For example, in certain embodiments, MOSFET 534 is closed to begin charging of capacitor 530 when the one or more solenoid valves are being held in the opened position. In alternative embodiments, capacitor 530 may be charged when solenoid coils 502 are de-energized to close the one or more solenoid valves. In certain embodiments, capacitor 530 is charged by pulsing MOSFET 534 when solenoid coils 502 are de-energizing, for example, during the "off" periods of the high-frequency PWM gate signal 510. For example, when gate signal 510 is pulsed at 200 hertz and 50% duty cycle, MOSFET 534 may then be pulsed at 200 hertz and 50% duty cycle during the "off" periods of gate signal 510.

Figure 6:
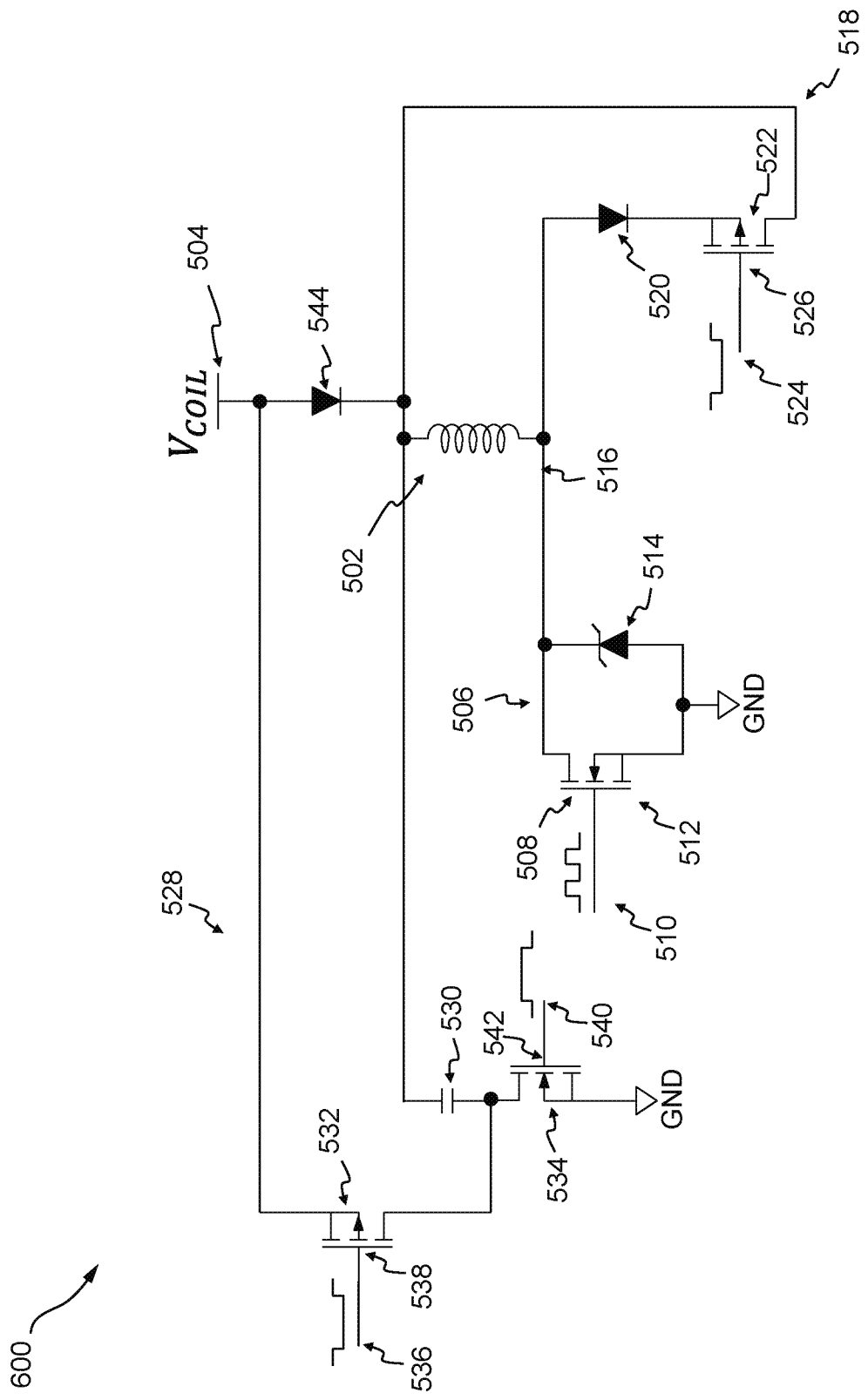
FIG. 6 is a schematic diagram of an alternative drive circuit for use in operating a solenoid.

FIG. 6 is a schematic diagram of a drive circuit 600 for use in operating a single solenoid or solenoid valve, such as, for example, solenoid valve 400, shown in FIG. 4. Drive circuit 600, although illustrated for a single solenoid coil 502, may be duplicated to operate a plurality of solenoids or solenoid valves individually. Drive circuit 600 otherwise operates in the same manner as drive circuit 500 shown in FIG. 5.

Figure 7:
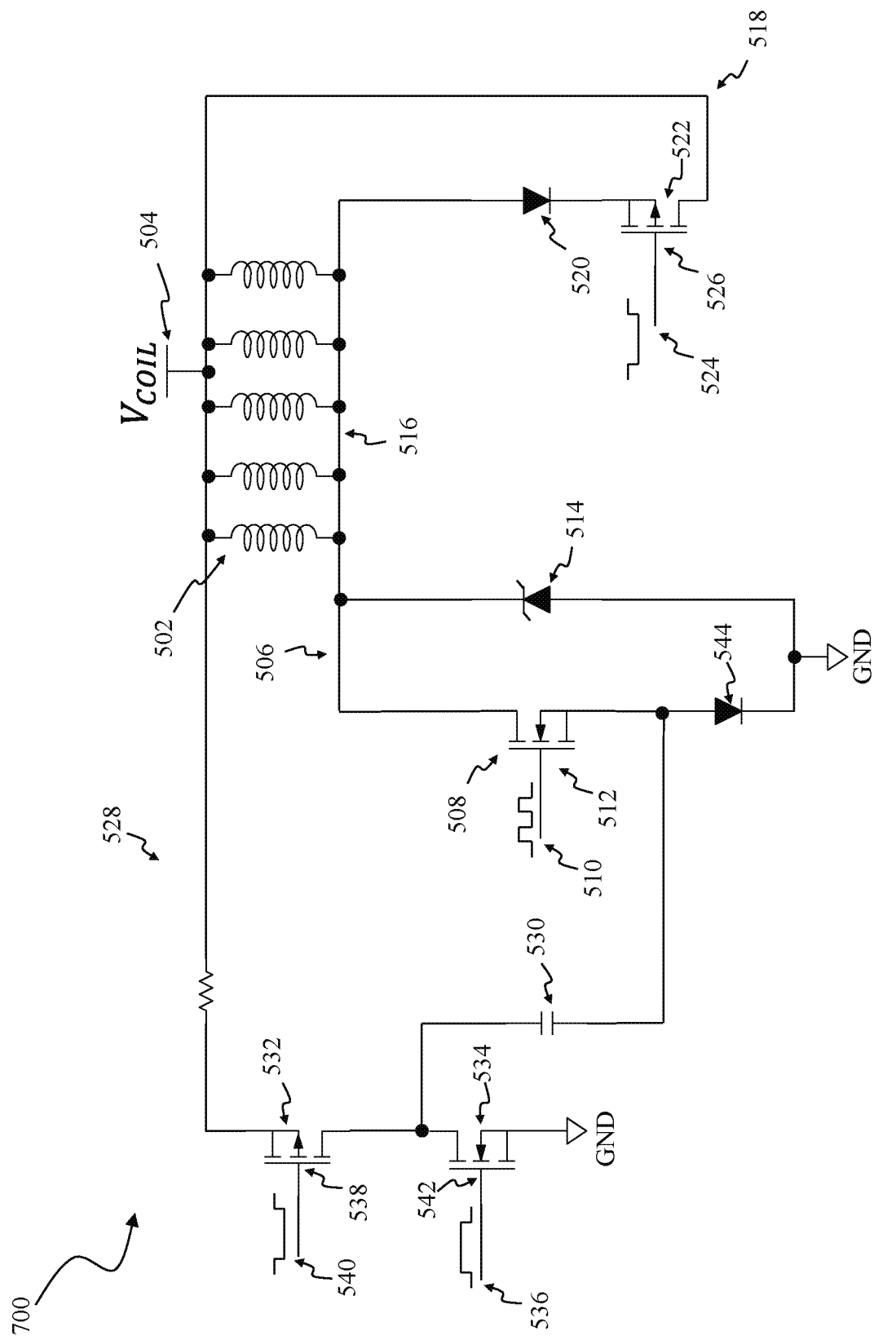
FIG. 7 is a schematic diagram of another alternative drive circuit for use in operating a group of solenoids.

FIG. 7 is a schematic diagram of a drive circuit 700 for use in operating a group of solenoids or solenoid valves, such as, for example, solenoid valve 400, shown in FIG. 4. As in drive circuit 500 described above, drive circuit 700 is configured to operate one or more valves (not shown) by generating a current signal, or waveform, for energizing respective solenoid coils of the one or more valves. The valves and, more specifically, their respective solenoid coils 502 are supplied a coil voltage (Vcoil), from coil voltage supply 504, and a ground path 506 for the one or more valves. Generally, when ground path 506 is closed, solenoid coils 502 conduct coil currents from coil voltage supply 504 to GND.

Drive circuit 700 includes a charge pump circuit 528. Charge pump circuit 528 includes a capacitor 530 that is selectively coupled in parallel or in series with solenoid coils 502 and FET 508 by MOSFET 532 and MOSFET 534. Generally, MOSFET 532 couples capacitor 530 in parallel with solenoid coils 502 and FET 508 when "charging" the charge pump, i.e., charging capacitor 530. When charging, MOSFET 532 is closed, or conducting, and MOSFET 534 is open, or not conducting, to enable current to flow through capacitor 530 to GND and to avoid a short circuit from coil voltage supply 504 to GND.

Capacitor 530 is coupled in series with solenoid coils 502 and FET 508 when "discharging" the charge pump, i.e., discharging capacitor 530. When discharging, MOSFET 532 is open, or not conducting, and MOSFET 534 is closed, or conducting, thereby re-referencing solenoid coils 502 to GND through capacitor 530. By re-referencing solenoid coils 502 to GND through capacitor 530, the negative potential across capacitor 530 adds to Vcoil supplied by coil voltage supply 504, thereby momentarily increasing the voltage applied across solenoid coils 502, or the "operating voltage" of solenoid coils 502.

MOSFET 532, in the embodiment of FIG. 7, is illustrated as a P-FET, although, in alternative embodiments, MOSFET 532 may be implemented with an N-FET or other suitable switching device. Likewise, MOSFET 534 is illustrated as an N-FET, but could be implemented with a P-FET or other suitable switching device in alternative embodiments.

MOSFET 532 is operated by a charge signal 540 applied to a gate 538 of MOSFET 532. Similarly, MOSFET 534 is operated by a discharge signal 536 applied to a gate 542 of MOSFET 534. Discharge signal 536 and charge signal 540, in certain embodiments, may be logic-level signals generated by, for example, controller 420. In alternative embodiments, discharge signal 536 and charge signal 540 are generated by one or more gate driver circuits (not shown).

Generally, when MOSFET 534 is closed, MOSFET 532 is opened to avoid shorting coil voltage supply 504 to GND. Instead, with MOSFET 532 opened and MOSFET 534 closed, capacitor 530 is coupled in parallel with diode 544, and further coupled in series with solenoid coils 502. Diode 544 is a low forward voltage diode, such as a Schottky diode or a germanium diode. Diode 544 blocks current sourced from capacitor 530 from conducting directly to GND. Accordingly, Vcoil and the potential across capacitor 530 momentarily add together and are applied across solenoid coils 502 when transitioning the solenoid valves from the closed position to the opened position. The resulting re-referencing and higher-voltage applied to solenoid coils 502 produces a larger rate-of-change of current, (di/dt), conducted through each of solenoid coils 502, further resulting in a faster opening time by more quickly achieving a sufficient coil current to overcome the closing force on the poppet and translate the poppet from the closed position to the opened position. In certain embodiments, the combined voltage of coil voltage supply 504 and capacitor 530 is applied immediately when gate signal 510 initiates opening of the valve. In other embodiments, only Vcoil is applied initially, and the combined voltage of coil voltage supply 504 and capacitor 530 is applied one or more milliseconds later. In certain embodiments, capacitor 530 may be discharged for 4 to 6 milliseconds. In other embodiments, capacitor 530 is discharged for 10 to 20 milliseconds. Moreover, capacitor 530 may be discharged at differing times during the translation of the poppet from the closed position to the opened position based on the goals of a particular embodiment of drive circuit 700. In some embodiments, capacitor 530 may be coupled in series with solenoid coils 502 for 20 milliseconds or more. Generally, the time necessary to translate the poppet from the closed position to the opened position varies, for example, for different sizes of valves, different solenoid coils, different operating voltage levels, and different operating fluid pressure levels across the one or more solenoid valves.

Once the poppet has translated to the opened position, MOSFET 534 may be opened to enable capacitor 530 to be charged when MOSFET 532 is subsequently closed. Generally, capacitor 530 may be charged at any time other than when discharging. For example, in certain embodiments, MOSFET 532 is closed to begin charging of capacitor 530 when the one or more solenoid valves are being held in the opened position. In alternative embodiments, capacitor 530 may be charged when solenoid coils 502 are de-energizing to close the one or more solenoid valves. In certain embodiments, capacitor 530 is charged by pulsing MOSFET 532 when solenoid coils 502 are de-energizing, for example, during the "off" periods of the high-frequency PWM gate signal 510. For example, when gate signal 510 is pulsed at 200 hertz and 50% duty cycle, MOSFET 532 may then be pulsed at 200 hertz and 50% duty cycle during the "off" periods of gate signal 510.

Figure 8:
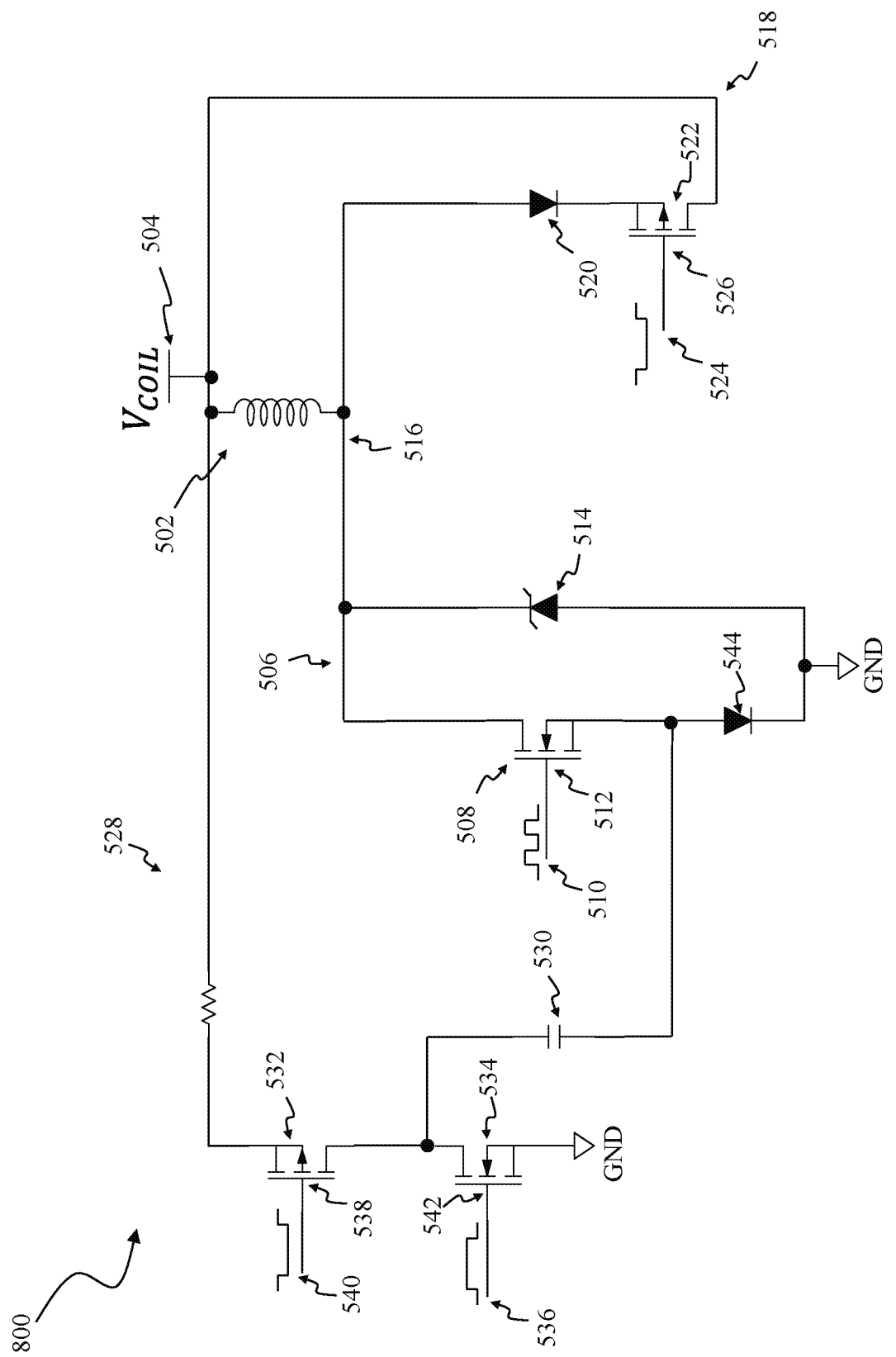
FIG. 8 is a schematic diagram of yet another alternative drive circuit for use in operating a solenoid.

FIG. 8 is a schematic diagram of a drive circuit 800 for use in operating a single solenoid or solenoid valve, such as, for example, solenoid valve 400, shown in FIG. 4. Drive circuit 800, although illustrated for a single solenoid coil 502, may be duplicated to operate a plurality of solenoids or solenoid valves individually. Drive circuit 800 otherwise operates in the same manner as drive circuit 700 shown in FIG. 7.

Figure 9:
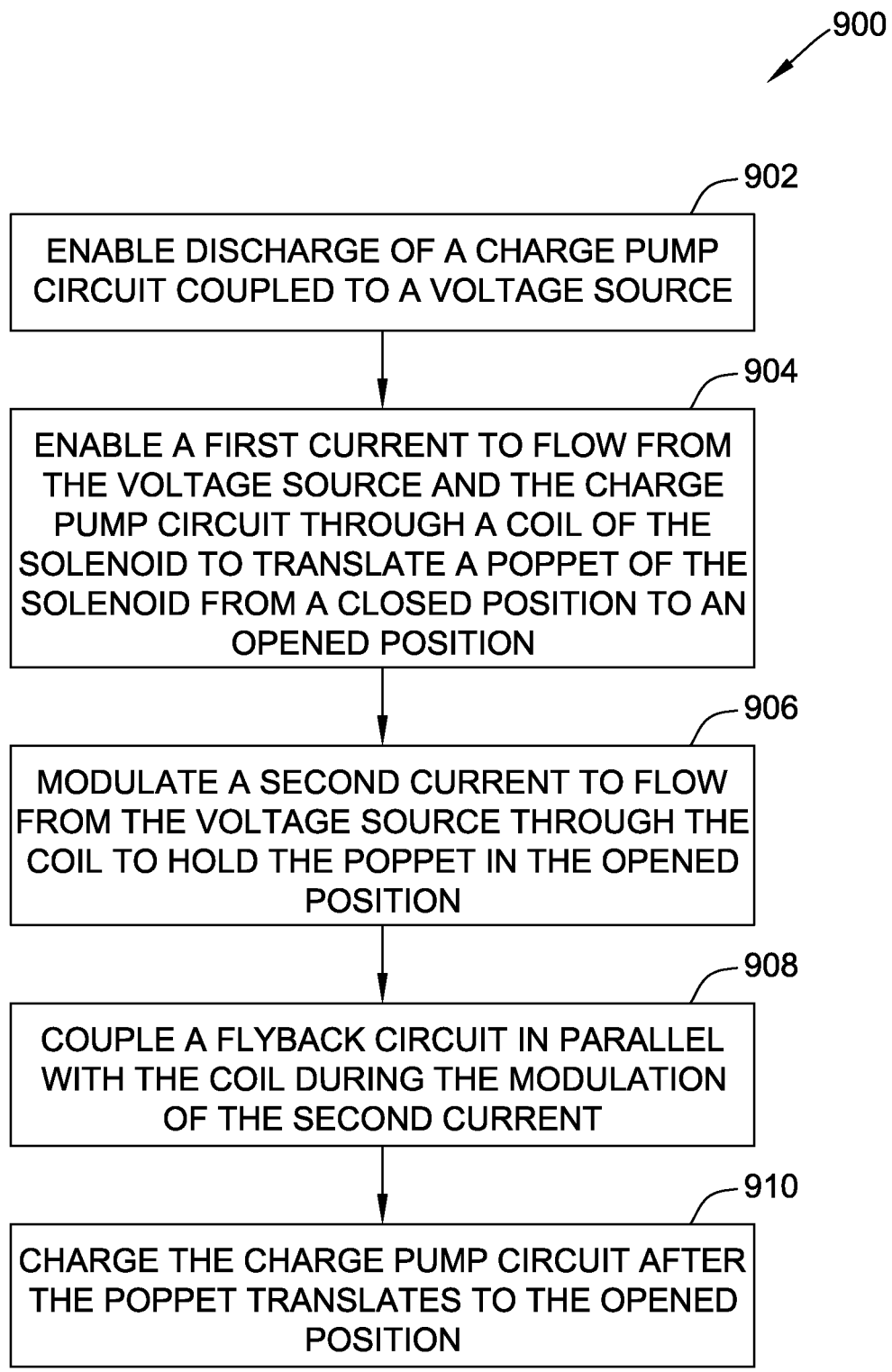
FIG. 9 is a flow diagram of an example method of operating a drive circuit for a solenoid.

FIG. 9 is a flow diagram of an example method 900 of operating a drive circuit, such as drive circuit 500 shown in FIG. 5, for a solenoid, such as that of solenoid valve 400 shown in FIG. 4. For the purpose of this disclosure, method 900 is described with respect to the solenoid valve and drive circuit shown in FIGS. 4 and 5, respectively, although it should be understood method 900 applies more generally to drive circuits for operating solenoids in any application, including, for example, agricultural sprayer systems, irrigation systems, in industrial spray driers, and in spray humidification or cooling systems.

Generally, as described above with respect to FIG. 5, drive circuit 500 is configured to operate one or more valves, such as solenoid valve 400, by generating a current signal, or waveform, for energizing respective solenoid coils 502 of the one or more valves to control the opening and closing of the one or more valves. For solenoids more generally, the solenoid coil is energized to translate a poppet from a resting position to an actuated position. The poppet is typically biased by spring that holds the poppet in the resting position, similar to spring 414 that biases poppet 412 toward the closed, or sealed, position for solenoid valve 400. When solenoid coil 502 is sufficiently energized, the biasing force of the spring and fluid pressure are overcome and the poppet translates, or actuates, to the actuated position, similar to the opened position for solenoid valve 400. When solenoid coil 502 is de-energized, the poppet is allowed to return to its resting position.

With reference to solenoid valve 400 and drive circuit 500, when opening solenoid valve 400, discharge of charge pump circuit 528 and, more specifically, capacitor 530, is enabled 902 by discharge signal 536. Discharge signal 536 commutates, or gates, MOSFET 532, thereby coupling capacitor 530 in series with coil voltage supply 504 and solenoid coils 502. MOSFET 534 is controlled such that it is not conducting, or is open. Gate signal 510 initiates opening of solenoid valve 400 by closing ground path 506 to enable 904 a first current to flow from coil voltage supply 504 and charge pump circuit 528, i.e., capacitor 530, through solenoid coils 502. The first current conducted through, for example, one of solenoid coils 502, such as solenoid coil 408 shown in FIG. 4, results in poppet 412 translating from a closed position to an opened position.

Once poppet 412 is in the opened position, gate signal 510 modulates 906 a second current flowing from coil voltage supply 504 through solenoid coil 408 to hold poppet 412 in the opened position. In certain embodiments, gate signal 510 modulates 906 the second current by pulse width modulating the current at a high frequency and with a given duty cycle to reduce the power consumption of drive circuit 500 in operating solenoid valve 400. Further, flyback circuit 518 is coupled 908 in parallel with solenoid coils 502 during modulation 906 of the second current. Flyback circuit 518 is enabled by MOSFET 522 and includes diode 520 that operates to slow the dissipation of energy from solenoid coils 502 when FET 508 is switched at a high frequency and, more specifically, during the off-periods of the high frequency switching, by "free-wheeling" the coil current induced by back EMF of solenoid coils 502. Flyback circuit 518 further enables reduction of the duty cycle of gate signal 510 and the duty cycle of the modulated second current conducted through solenoid coils 502. Flyback circuit 518 also enables faster closure of solenoid valve 400 due to the reduced second current conducted by solenoid coils 502.

Additionally, once poppet 412 is in the opened position, discharge signal 536 is disabled or removed from MOSFET 532 to enable charging 910 of capacitor 530 when MOSFET 534 is closed by charge signal 540. Charge signal 540 couples capacitor 530 in parallel, or across, coil voltage supply 504 for a charging period of time. In certain embodiments, the charging period may be in the range of 5 or fewer milliseconds. In certain embodiments, for example, capacitor 530 charges in about 3 to 4 milliseconds. In other embodiments, charging of capacitor 530 may consume more time depending on, for example, the size of capacitor 530, the operating voltage of solenoid coils 502, e.g., Vcoil, and the desired potential to build up on capacitor 530. Generally, the time needed to charge capacitor 530 is less than the duration solenoid valve 400 is held in the opened position. For example, in certain embodiments, solenoid valve 400 is held open for about 15 milliseconds.

When solenoid valve 400 is to be closed, FET 508 is commutated to open ground path 506 and de-energize solenoid coils 502, and flyback circuit 518 is disabled via FET 522. During de-energizing, protection diode 514 free-wheels a third current induced by solenoid coils 502 to protect FET 508 from excessive voltage buildups on node 516 due to FET 508 interrupting the second current conducted by solenoid coils 502. When solenoid coil 408, for example, is sufficiently de-energized, poppet 412 translates back to the closed position.

Embodiments of the drive circuits and methods described herein utilize a charge pump circuit to reduce time delays in opening a solenoid valve by momentarily increasing the operating voltage of the solenoid coil when opening the valve. Given that the required force for translating the poppet of a solenoid valve is at its peak when translating from the closed position to the opened position, the necessary force for holding the poppet in the opened position is significantly reduced. Accordingly, in the embodiments described herein, the operating voltage of the solenoid valve is increased momentarily when opening the solenoid valve to reduce the time necessary to reach a coil current sufficient to translate the poppet to the opened position, thereby reducing the turn-on time delay. The coil current may then be reduced, e.g., by high-frequency pulse width modulation of the current signal supplied to the solenoid coil, when holding the poppet in the opened position to conserve power. Further, embodiments of the drive circuits and methods described herein utilize a switched flyback circuit to reduce power consumption and to reduce turn on and turn off times in operating the solenoid valve by enabling reductions in duty cycle of the current signal supplied to the solenoid coil and, in certain embodiments, by throttling current.

Although systems and methods are described above with reference to a seed planting system, embodiments of the present disclosure are suitable for use with other fluid application systems. In some embodiments, for example, the systems and methods of the present disclosure are implemented in a fluid spraying system that applies fluid, such as fertilizer, to the soil through nozzles or dispensing tubes. In yet other embodiments, systems and methods of the present disclosure may be implemented in any system, whether commercial, industrial or residential, that utilizes valves connected to a distribution conduit or distribution manifold, such as irrigation systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed:

1. A drive circuit for operating a solenoid, comprising:
    a main switch coupled in series with a coil of the solenoid, the main switch configured to selectively enable current flow from a voltage source according to a main switching signal to translate a poppet of the solenoid between an opened position and a closed position;
    a charge pump circuit coupled to the voltage source, the charge pump circuit configured to discharge through the coil to translate the poppet from the closed position to the opened position, and to charge when the poppet is held in at least one of the opened position and the closed position; and
    a flyback circuit coupled in parallel to the coil, the flyback circuit configured to be enabled when the poppet is held in the opened position, wherein the flyback circuit comprises a diode and a flyback switch coupled in series, the flyback switch configured to enable and disable the flyback circuit according to a flyback switching signal.

2. The drive circuit of claim 1 further comprising a protection diode coupled in parallel with the main switch.

3. The drive circuit of claim 1 further comprising at least one processor configured to generate the main switching signal as a variable frequency variable duty cycle switching signal.

4. The drive circuit of claim 1 further comprising at least one processor configured to generate the flyback switching signal.

5. The drive circuit of claim 4, wherein the at least one processor is electrically isolated from the flyback switch.

6. The drive circuit of claim 1, wherein the flyback switch comprises a metal-oxide semiconductor field effect transistor (MOSFET).

7. The drive circuit of claim 1, wherein the diode comprises a diode selected from the group consisting of:
    a Schottky diode; and
    a germanium diode.

8. The drive circuit of claim 1, wherein the diode comprises a low-forward voltage diode having a forward voltage in a range of about 150 millivolt to 450 millivolt.

9. The drive circuit of claim 1, wherein the charge pump circuit comprises:
    a capacitor; and a plurality of switches configured to selectively couple the capacitor in parallel with the voltage source to charge the capacitor, and to selectively couple the capacitor in series with the voltage source to discharge the capacitor through the coil.

10. The drive circuit of claim 9 further comprising at least one processor configured to generate charge pump switching signals for operating the plurality of switches of the charge pump circuit, the charge pump switching signals configured to:
couple the capacitor in parallel with the voltage source when the poppet is held in the opened position; and
couple the capacitor in series with the voltage source to translate the poppet from the closed position to the opened position.

11. A method of operating a drive circuit for a solenoid, the method comprising:
enabling discharge of a charge pump circuit coupled to a voltage source;
enabling a first current to flow from the voltage source and the charge pump circuit through a coil of the solenoid to translate a poppet of the solenoid from a closed position to an opened position;
modulating a second current to flow from the voltage source through the coil to hold the poppet in the opened position, wherein modulating the second current comprises pulse-width modulating the second current to a high-frequency pulse-width modulated (PWM) current signal to hold the poppet in the opened position;
charging the charge pump circuit after the poppet translates to the opened position; and
coupling a flyback circuit in parallel with the coil during the modulating of the second current, wherein coupling the flyback circuit in parallel with the coil comprises commutating a flyback switch to couple a low-forward voltage diode in parallel with the coil when the high-frequency PWM current signal is supplied to the coil to hold the poppet in the opened position.

12. The method of claim 11, wherein enabling discharge of the charge pump circuit comprises commutating a plurality of switches of the charge pump circuit to couple a capacitor of the charge pump circuit in series with the voltage source.

13. The method of claim 11, wherein charging the charge pump circuit comprises commutating a plurality of switches of the charge pump circuit to couple a capacitor of the charge pump circuit in parallel with the voltage source.

14. The method of claim 11, wherein enabling the first current to flow from the voltage source and the charge pump circuit comprises commutating a main switch to couple the voltage source, a capacitor of the charge pump circuit, and the coil in series to ground.

15. The method of claim 11 further comprising de-energizing the coil of the solenoid to translate the poppet of the solenoid from the opened position to the closed position.

16. The method of claim 15, wherein de-energizing the coil comprises commutating a main switch to interrupt the second current conducted through the coil to ground.

17. The method of claim 16, wherein de-energizing the coil further comprises dissipating energy stored in the coil via a third current that flows from the coil through a protection diode coupled in parallel with the main switch.

18. The method of claim 11, wherein enabling the first current to flow comprises:
applying a coil voltage from the voltage source at a first time; and
applying a capacitor voltage from the charge pump circuit at a second time after the first time.

19. The method of claim 11, wherein charging the charge pump circuit after the poppet translates to the opened position comprises charging the charge pump circuit after the poppet translates back to the closed position.

20. The method of claim 11, wherein charging the charge pump circuit after the poppet translates to the opened position comprises charging the charge pump circuit when the poppet is held in the opened position.

21. A method of operating a drive circuit for a solenoid, the method comprising:
enabling discharge of a charge pump circuit coupled to a voltage source;
enabling a first current to flow from the voltage source and the charge pump circuit through a coil of the solenoid to translate a poppet of the solenoid from a closed position to an opened position, wherein enabling the first current to flow comprises:
applying a coil voltage from the voltage source at a first time; and
applying a capacitor voltage from the charge pump circuit at a second time after the first time;
modulating a second current to flow from the voltage source through the coil to hold the poppet in the opened position; and
charging the charge pump circuit after the poppet translates to the opened position.

22. A drive circuit for operating a solenoid, the drive circuit comprising:
a charge pump circuit coupled to a voltage source; and
a main switch coupled in series with a coil of the solenoid;
wherein the charge pump circuit and the main switch are configured to enable a first current to flow from the voltage source and the charge pump circuit through the coil to translate a poppet of the solenoid from a closed position to an opened position;
wherein, to enable the first current to flow, the charge pump circuit and the main switch are configured to:
apply a coil voltage from the voltage source at a first time; and
apply a capacitor voltage from the charge pump circuit at a second time after the first time;
wherein the main switch is configured to modulate a second current to flow from the voltage source through the coil to hold the poppet in the opened position; and
wherein the charge pump circuit is configured to charge after the poppet translates to the opened position.

23. The drive circuit of claim 22, further comprising a flyback circuit coupled in parallel to the coil, the flyback circuit configured to be enabled when the poppet is held in the opened position, wherein the flyback circuit comprises a diode and a flyback switch coupled in series, the flyback switch configured to enable and disable the flyback circuit according to a flyback switching signal.

24. The drive circuit of claim 22, wherein the charge pump circuit comprises:
a capacitor configured to provide the capacitor voltage; and
a plurality of switches configured to selectively couple the capacitor in parallel with the voltage source to charge the capacitor, and to selectively couple the capacitor in series with the voltage source to discharge the capacitor through the coil.

25. The drive circuit of claim 24, wherein the plurality of switches are configured to:

couple the capacitor in parallel with the voltage source when the poppet is held in the opened position; and couple the capacitor in series with the voltage source to translate the poppet from the closed position to the opened position.

26. The drive circuit of claim 22, wherein the main switch is configured to pulse-width modulate the second current to hold the poppet in the opened position.

27. The drive circuit of claim 22, wherein the charge pump circuit is configured to charge after the poppet translates from the opened position to the closed position.

* * * * *